(12) United States Patent
Vytla et al.

(10) Patent No.: US 10,171,361 B1
(45) Date of Patent: Jan. 1, 2019

(54) SERVICE-SPECIFIC PROBES IN A NATIVE LOAD BALANCER

(71) Applicant: CISCO TECHNOLOGY, INC., San Jose, CA (US)

(72) Inventors: Mouli Vytla, San Jose, CA (US); Samar Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 15/157,250

(22) Filed: May 17, 2016

Related U.S. Application Data

(60) Provisional application No. 62/216,766, filed on Sep. 10, 2015.

(51) Int. Cl.
| | |
|---|---|
| *H04L 5/00* | (2006.01) |
| *H04L 12/803* | (2013.01) |
| *H04L 12/947* | (2013.01) |
| *H04L 12/26* | (2006.01) |

(52) U.S. Cl.
CPC .......... *H04L 47/125* (2013.01); *H04L 5/0048* (2013.01); *H04L 43/08* (2013.01); *H04L 49/25* (2013.01)

(58) Field of Classification Search
CPC .......... H04L 5/008; H04L 43/08; H04L 49/25
See application file for complete search history.

(56) References Cited

U.S. PATENT DOCUMENTS

| | | | | |
|---|---|---|---|---|
| 8,125,911 | B2* | 2/2012 | Patel | H04L 12/5691 370/241 |
| 9,596,164 | B1* | 3/2017 | Kumar | H04L 43/12 |
| 2004/0260755 | A1* | 12/2004 | Bardzil | H04L 41/12 709/200 |
| 2009/0232003 | A1* | 9/2009 | Vasseur | H04L 12/4633 370/236.2 |
| 2013/0170507 | A1* | 7/2013 | Hsueh | H04L 63/0428 370/503 |
| 2014/0201375 | A1* | 7/2014 | Beereddy | H04L 47/70 709/226 |
| 2015/0229550 | A1* | 8/2015 | Addeo | H04L 43/10 709/224 |
| 2016/0072784 | A1* | 3/2016 | Liang | H04L 63/0892 726/4 |
| 2016/0261478 | A1* | 9/2016 | Navasivasakthivelsamy | H04L 43/10 |
| 2017/0142001 | A1* | 5/2017 | Brabson | H04L 45/22 |

* cited by examiner

*Primary Examiner* — Chi Ho A Lee
(74) *Attorney, Agent, or Firm* — Merchant & Gould P.C.

(57) ABSTRACT

In an example, there is disclosed a network apparatus for providing native load balancing, including: a first network interface to communicatively couple to a first network; a plurality of second network interfaces to communicatively couple to a second network; one or more logic elements providing a switching engine to provide network switching or routing; and one or more logic elements, including at least one hardware logic element, providing a load balancing engine to: load balance network traffic among a plurality of service nodes; probe a service node with a first probe for a first service; and probe the service node with a second probe for a second service, the second probe different in kind from the first probe.

19 Claims, 9 Drawing Sheets

ROUTING TABLE 400

| TRAFFIC BUCKET | NODE |
|---|---|
| B0 | N0 |
| B1 | N1 |
| B2 | N2 |
| B3 | N3 |
| B4 | N0 |
| B5 | N1 |
| B6 | N2 |
| B7 | N3 |

…

SERVICE-SPECIFIC PROBES IN A NATIVE LOAD BALANCER

CROSS-REFERENCE TO RELATED APPLICATION

This application claims the benefit of priority under 35 U.S.C. § 119(e) to U.S. Provisional Application Ser. No. 62/216,766 entitled "MULTIPLE HEALTH MONITORING METHODS FOR LOAD DISTRIBUTION OF MULTIPLE APPLICATIONS ON A NETWORK SWITCH," filed Sep. 10, 2015, which is hereby incorporated by reference in its entirety.

FIELD OF THE DISCLOSURE

This disclosure relates in general to the field of network communications and, more particularly, to providing service-specific probes in a native load balancer.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In another example, the dimensions of the various features may be arbitrarily increased or reduced for clarity of discussion.

OVERVIEW

Figure 1A:
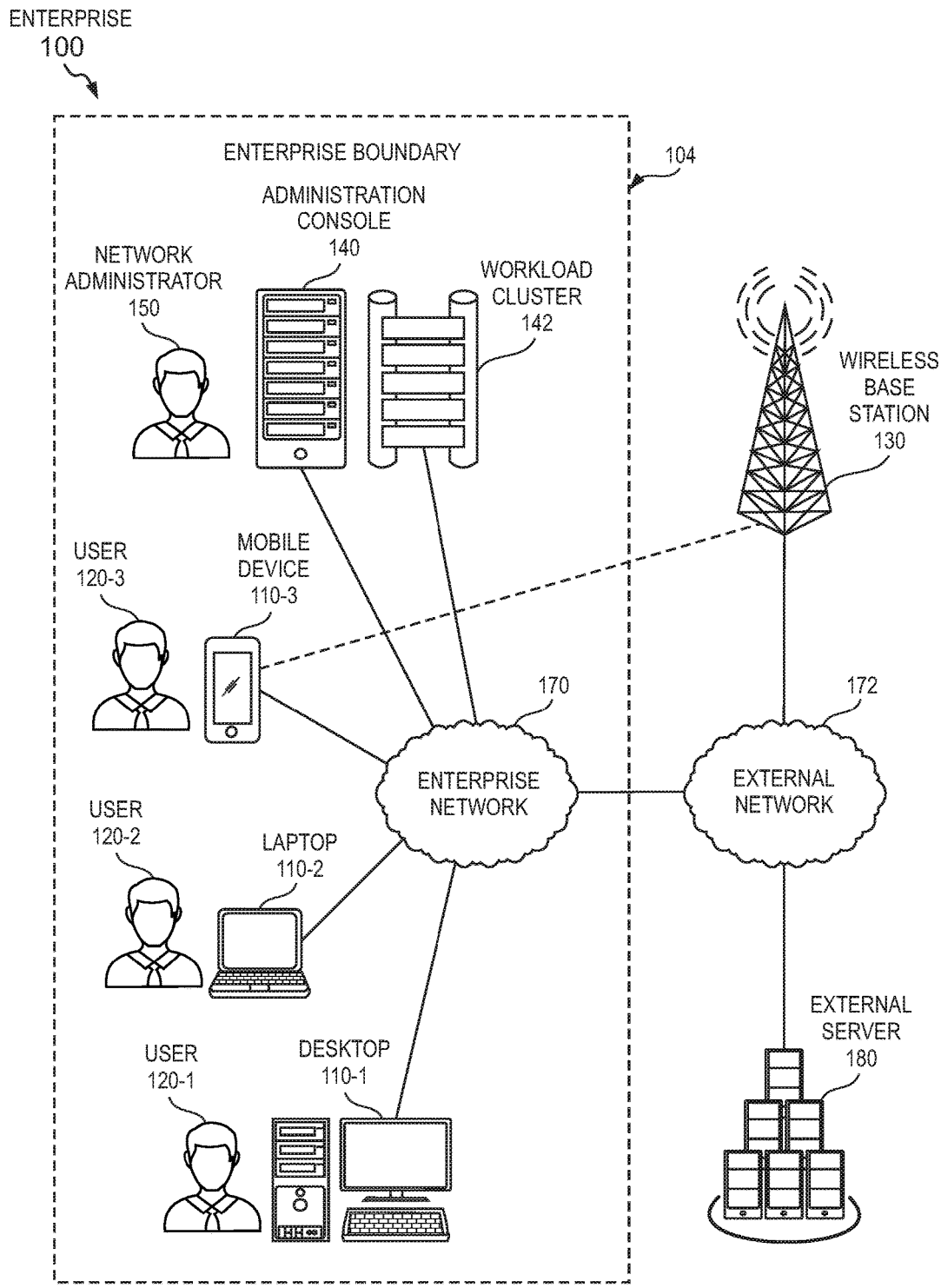
FIG. 1A is a network level diagram of an enterprise computing environment according to one or more examples of the present Specification.

In an example, there is disclosed a network apparatus for providing native load balancing, including: a first network interface to communicatively couple to a first network; a plurality of second network interfaces to communicatively couple to a second network; one or more logic elements providing a switching engine to provide network switching or routing; and one or more logic elements, including at least one hardware logic element, providing a load balancing engine to: load balance network traffic among a plurality of service nodes; probe a service node with a first probe for a first service; and probe the service node with a second probe for a second service, the second probe different in kind from the first probe.

DETAILED DESCRIPTION OF THE EXAMPLE EMBODIMENTS

The following disclosure provides many different embodiments, or examples, for implementing different features of the present disclosure.

In an example of a known computing system, a cluster of workload servers may be provisioned, either as physical servers or as virtual machines, to provide a desired feature to end-users or clients. To provide just one non-limiting example, the workload servers may provide a website. When a plurality of users make a large number of simultaneous connections to the website, it is necessary to appropriately distribute the workload among the various servers in the server farm.

To this end, incoming traffic from client devices may be routed to a network switch. The network switch may then forward the traffic to a load balancer. An example of a commonly used load balancer is a network appliance or virtual appliance running a Linux operating system and provided with a full network stack, as well as load-balancing logic for determining to which server to send the traffic.

For example, a workload cluster may include 16 nodes; either physical servers or virtual machines. The load balancer itself may also be either a physical appliance or a virtual appliance. Upon receiving a packet, the load balancer determines the load on each of the 16 workload servers. The load balancer then applies an algorithm to determine an appropriate node for handling the traffic. This may include, for example, identifying a least burdened node and assigning the traffic to that node. Each node may have its own IP address, which in one embodiment is not exposed to end-user client devices. Rather, client devices are aware only of the IP address of the load balancer itself. Thus, the load balancer may modify the packet header, for example, by assigning it to the virtual IP (VIP) of one of the workload servers. The load balancer may then return the packet to the switch, which routes the packet to the appropriate workload server.

In this example, the incoming packet transfers from the switch to the load balancer, which may provide the full OSI or TCP/IP 7-layer "stack" in software, operating on a full-featured operating system, such as Linux. Thus, the incoming packet is abstracted up to one of the upper layers of the OSI model, such as layer 6 or 7, so that it can be handled by the load-balancing software. The packet is then de-abstracted to a lower layer and returned to the switch, which forwards it to the appropriate workload server. Upon receiving the packet, the workload server again abstracts the packet up to one of the higher levels of the OSI model.

However, in certain embodiments, the load balancer and its overhead represent a potential bottleneck that reduces the scalability of the network environment, and slows down handling of network traffic. The process of passing the packet up and down the TCP/IP stack, in particular, while very fast from a human point of view, can be a significant bottleneck from the point of view of a network.

To reduce this bottlenecking, a network device, such as a switch or a router, can be configured to natively act as a load balancer in addition to performing its ordinary network switching function. In that case, rather than provide a load-balancing algorithm in an application running on an operating system, the switch may provide load-balancing via a much faster solution, such as programmable hardware rather than a general purpose software-driven processor. This means that the load-balancing logic is handled mostly or entirely at the hardware level. Furthermore, the switch generally operates at lower levels of the TCP/IP model, such as layers 1 and 2. Thus, it has reduced overhead in abstracting and de-abstracting packets through the TCP/IP stack.

Thus, the switch itself becomes the load balancer, and rather than acting as a bottleneck, is capable of providing terabit-class bandwidth by operating at the hardware level.

In an example, a concept of traffic buckets and nodes is described. Traffic may be divided into "buckets." Each bucket may be assigned to a node.

A traffic bucket serves as a classifier for identifying a subset of traffic to be redirected. As many traffic buckets can be created as needed for granularity. For bucketization of traffic, various L2/L3 header fields can be used in the algorithm.

By selecting different fields, many buckets can be created. By way of example, B0, B1, B2, B3, B4 . . . . Bn can be used to designate traffic buckets.

A traffic node serves as a "next-hop" for traffic forwarding. A node is an entity that has an associated IP address reachable from the switch. By way of example, we can use N0, N1, N2, N3 . . . Nn to designate nodes.

Mapping can be established to associate a traffic bucket to a node. This association creates a packet path for forwarding of traffic for each bucket. This can include one-to-one mapping of a traffic bucket to a node, or many-to-one mapping of traffic buckets to a node (i.e., multiple nodes may be assigned to a single node).

This architecture realizes substantial advantages over certain existing deployments. For example, some existing load balancers suffer from shortcomings such as inefficiency and expense. In one example, a low capacity load-balancer provides approximately 40 Gbps, while a higher-end load balancer provides approximately 200 Gbps.

As discussed above, speed and scalability are enhanced by programming the load balancing engine in programmable hardware rather than in software running on a general-purpose processor programmed by software. Programmable hardware includes, for example, an application-specific integrated circuit (ASIC), field-programmable gate array (FPGA), programmable logic array (PLA), or similar. Because the logic is implemented directly in hardware, it can execute a "program" orders of magnitude faster than a CPU, which must fetch instructions from memory, and then run those instructions on general-purpose hardware. Furthermore, an operating system, multitasking, and multi-layer network stack introduce additional complexity that does not contribute directly to carrying out the load balancing function. In short, a software-programmable CPU is extremely versatile, and its function may be easily adapted to many different tasks, but it is relatively slow. A dedicated programmable hardware device, programmed only for a single function, is not versatile, but carries out its single, dedicated function very quickly.

In one example, a hardware-based load balancer of the present Specification must be able to handle both traffic that is to be load balanced, and traffic that does not require load balancing. For non-load-balanced traffic, the device should still perform its native function as a switch or router, and simply switch or route the traffic as appropriate.

To aid in this, and to preserve the speed advantage of the programmable hardware-based load balancing engine, it is advantageous not to store data values in standard memories such as random access memories (RAM), as this could negate the speed advantages of the hardware. Rather, in one example, a ternary content-addressable memory (TCAM) is provided, and may be capable of operating at speeds approaching the speed of the programmable hardware itself. A content-addressable memory (CAM) is a species of memory used in extremely high-speed searches, such as those necessary for native terabit-class load balancing. CAM compares the search input (tag) to a table of stored data, and returns the address of matching datum. This is in contrast to RAM, in which the program provides an address, and the RAM returns a value stored at that address. When a search is performed, if the CAM finds a match for the tag, the CAM returns the address of the tag, and optionally, the value of the tag as well. If the tag is not found, a "not found" value is returned. TCAM is a species of CAM, in which a tag can be searched not only for a binary "1" or "0," but also for a ternary "X" (don't care). In other words, the search tag "110X" matches both "1101" and "1100."

In the context of load balancing, a network administrator may configure a virtual IP (VIP) tag, including in one example an IP address, protocol, and port number. Entries may be made in the TCAM for VIP tags that are to be load balanced. Entries may also be made for a set of nodes that can receive traffic matching that VIP tag.

The switch advertises the VIP tag via routing protocols, and receives traffic destined for VIP. When traffic enters the switch or router, the VIP tag is checked against entries in the TCAM. If there is a matching entry, the traffic is to be load balanced. The traffic is then bucketized and load balanced to each node using TCAM entries.

This architecture realizes several important advantages. As servers move from 1 Gbps to 10 Gbps, traditional software load balancers have to scale appropriately. Load balancer appliances and service modules also consume rack-space, power, wiring and cost. However, in an embodiment of the present Specification:

a. Every port of a switch or router can act as a load-balancer.
b. No external appliance and no service module are needed.
c. The teachings of this Specification can be used to provide terabit-class load balancing.

Furthermore, scalability is greatly enhanced. Many network switches have the ability to modularly increase their size by adding on I/O modules. For example, a switch may have a baseline size of 48 ports, wherein each port can be connected to one physical server appliance. The physical server appliance may be a standalone appliance providing the workload service, or may be a server configured to provide a hypervisor and to launch instances of virtual machines on demand. If the 48 ports on the switch are exhausted, an additional I/O module, for example providing an additional 48 ports, may be added onto the switch. Thus, the switch can be scaled up to extremely large sizes with minimal configuration. The switch itself may be provided with a load-balancing engine, which in this case may include dedicated hardware, firmware, or very low-level software such as BIOS to provide the load-balancing logic.

A switch provisioned as a load balancer also provides other useful functions. For example, reliability and availability of servers or appliances in a device pool may be of critical concern to consumers of the service. Because equipment may fail, or in a dynamic virtualized environment, new nodes may be dynamically provisioned and terminated, disruptions in service can occur, and can disrupt business operations. Thus, the load balancing engine may periodically probe service nodes to determine whether they are still up and running. This helps to ensure that the load balancing engine is aware of which service nodes are available for load balancing. The load balancing engine may also periodically probe ingress interfaces to ensure that at least one ingress interface is available.

The system and method disclosed for probing service nodes helps with the detection and handling of critical errors like cluster node failure, cluster node unreachability, link failure, port/interface down, process crash, switch reboot, switchover, ingress interface failure etc.

In an example, the load balancing engine periodically probes each node. It then creates tracking objects for each probe to monitor the nodes. It then provides the user the option to create and use ICMP, TCP, UDP or DNS protocols to monitor the health of the nodes.

In some embodiments, a user such as a network administrator can configure the type of probe, frequency, timeout, the number of times a probe is retried before declaring the state of a node as "failed" and also the number of retries before declaring a node as "active." Advantageously, in one embodiment, only a single line of configuration is required to activate this feature.

Furthermore in an embodiment, the administrator may configure this as part of a device group configuration, so that the configuration is propagated simultaneously to all cluster nodes. The load balancing engine may also monitor the state of ingress interface(s) and marks the service as Active or Inactive accordingly.

The UP/DOWN state of one or more ingress interfaces may also be periodically monitored using the corresponding tracking objects created. If at least one ingress interface state is 'UP', the switching and load balancing service remains in its "ACTIVE" state. If all the ingress interfaces are DOWN, the service may be marked as inactive, and traffic policies removed. Later, if at least one ingress interface becomes 'UP', the service again goes to an active state, and traffic policies may be configured again.

After determining that a node has either gone down or has come back up, the load balancing engine may also make decisions about how to handle routing and load balancing. In one example, a "standby" solution is provided, in which a standby node is maintained in an up-and-running state, ready to take over for a failed node when it goes down. This may allow traffic to continue substantially uninterrupted while the original service node is brought back into operation. Once the original node is brought back up, the load balancing engine may re-assign the traffic buckets back to it, and then the standby node may return to its standby function.

In other examples, no standby node is maintained, and each service node instead has a "next-to-try" or similar node wherein the load balancing engine tries to reassign traffic buckets for a failed node to another node in the cluster. This may be, for example, the next ordinally-numbered node in the list. For example, if there are 8 nodes and 16 buckets, with buckets 1 and 9 assigned to node 1, then a failure of node 1 may result in buckets 1 and 9 being reassigned to node 2. If node 2 has buckets 2 and 10 assigned to it, and if node 2 also goes down, then buckets 1, 2, 9, and 10 may all be assigned to node 3 and so on.

Evidently, continuing to assign additional buckets to available nodes will result in higher loads on those nodes. Thus, in some cases, it is desirable to set a maximum threshold where a node becomes so congested that it is no longer worth operating. In that case, it may be desirable to mark the entire cluster as unavailable, though in many cases this will be considered a "last resort."

In some cases, where a standby node is not designated, failure of a particular node may simply mean that traffic assigned to that node is not load balanced, and the switch simply performs its ordinary switching or routing function upon receiving the traffic. In some cases, this may result in dropped connections, which may in fact draw attention to the issue of the node failure.

In one example, upon marking a service node as down, the load balancing engine may perform the following tasks automatically to minimize traffic disruption and to redistribute the traffic to remaining operational nodes:

a. Determine if a standby node is configured to take over from the failed node.
 b. Identify the node as a candidate node for traffic handling, if the standby node is operational.
 c. Redefine the standby node as active for traffic handling.
 d. Assign traffic buckets from the failed node to the newly-activated standby node.

Once the failed node comes back up, it resumes handling its traffic buckets, and the standby node returns to standby status.

The present Specification designates four failure handling modes, by way of non-limiting example:

a. Failaction Reassignment Without a Standby Server
 b. Failaction Reassignment with a Standby Server
 c. No Failaction Reassignment Failaction Reassignment without a Standby Server.

When a service node goes down, the traffic buckets assigned to that service node are reassigned to the first active service node found by traversing the list of available service nodes sequentially. (Reaching the end of the list may result in "looping back" to 1). If the newly reassigned service node also fails, the traffic or ACL is reassigned to the next available active service node. Once the failed service node comes back online and becomes active, traffic buckets are diverted back to the original service node.

If all service nodes are down, traffic gets routed or switched according to the switches normal function.

Failaction Reassignment with a Standby Server

When a service node is down, and if the standby is active, the traffic serves the connections and there is no change in the bucket assignment. When both the active and standby servers are down, the traffic associated with the server is reassigned to the first active server found in the configured set of nodes. If the newly reassigned node also fails, the traffic is reassigned to the next available active server. Once the failed server comes back up and becomes active, the traffic is diverted back to the original service node, which begins servicing the traffic again.

In summary:
a. When the service node goes down (probe failed) and when there is a working standby server, traffic is directed to the first available standby server.
b. When all service nodes are down, including the standby node, the traffic is reassigned to the first available active service node.
c. When the service node comes up (probe success) from a failed state, the service node that came up starts handling connections.
d. If all the service nodes are down, the packets are routed or switched automatically.

No Failaction Reassignment

In one embodiment, when service node reassignment is not configured, there are two possible scenarios: (1) probe configured and (2) no probe configured.

Within probe configured, the options are (1) with standby configured, and (2) without standby configured.

There may also be no failaction reassignment with a probe configured, and no failaction reassignment without a probe configured.

In no failaction reassignment with a probe configured, the load balancing engine probe can detect a service node failure, or the lack of service reachability.

If the service node fails and a standby is configured, the standby server takes over the connections.

If the service node fails and there is no standby configuration, the traffic gets routed or switched normally and does not get reassigned, as failaction is not configured. Once the failed service node recovers, the recovered service node starts handling the traffic.

In no failaction reassignment without a probe configured, the load balancing engine does not detect the node failure. When the node is down, the load balancing engine does not reassign or redirect the traffic to an active server.

The table below summarizes the options and behaviors of the foregoing examples. It should be noted that these options and behaviors are provided by way of non-limiting example only to illustrate one embodiment of the present Specification. Other options and behaviors may be selected in other embodiments.

| FailureModes | | | | |
|---|---|---|---|---|
| Mode | Probe? | Standby? | Behavior on Primary Failure | Behavior on Standby Failure |
| Bypass | N | N | Route normally (no LB) | Route normally (no LB) |
| Bypass | N | Y | Redirect to standby | Route normally |
| Bypass | Y | N | Route normally | Route normally |
| Bypass | Y | Y | Redirect to standby | Route normally |
| Reassign | N | N | Route normally | Route normally |
| Reassign | N | Y | Redirect to standby | Route normally |
| Reassign | Y | N | Redirect to first available active node | Redirect to first available active node |
| Reassign | Y | Y | Redirect to standby | Redirect to first available active node |

Figure 7:
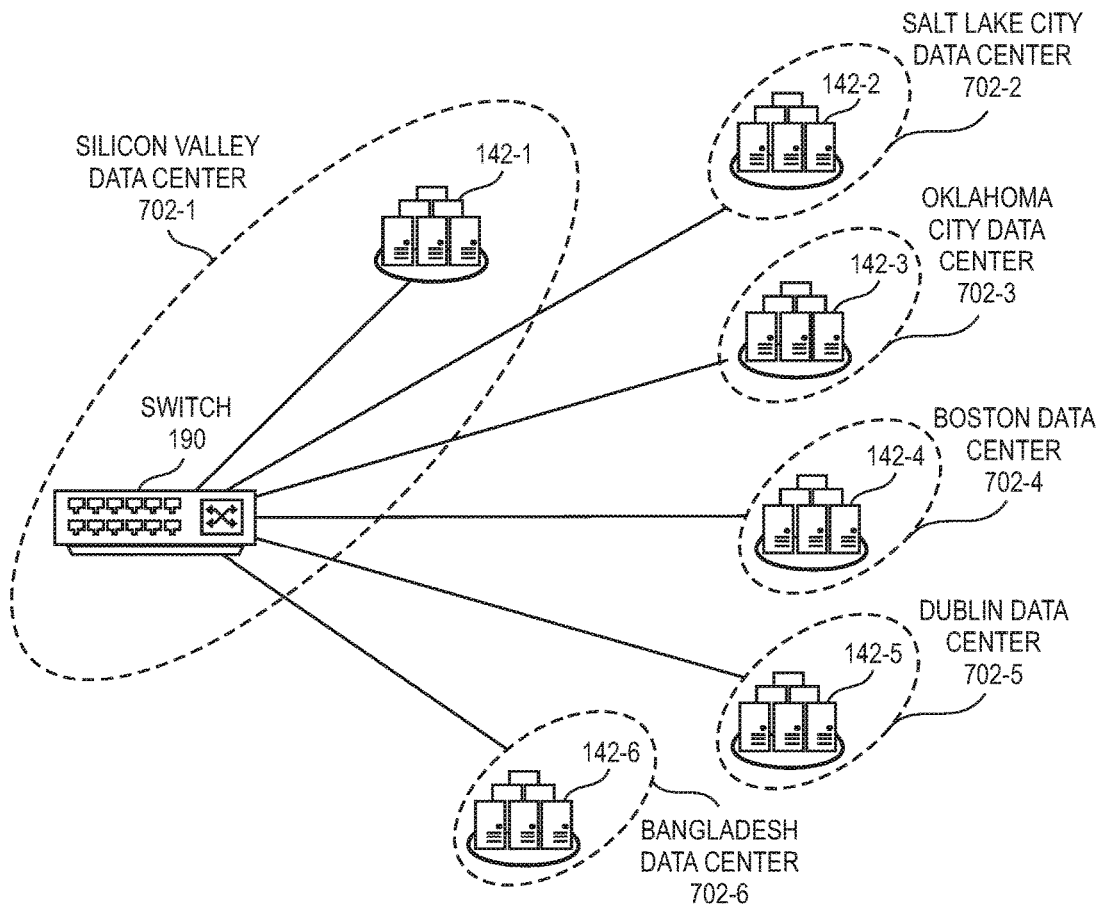
FIG. 7 is a network diagram according to one or more examples of the present Specification.

In some cases, a device pool to be load balanced and probed may include devices with different capabilities, and thus different abilities to handle workload capacity. Device pools may also be located in many different locations. For example, a workload cluster may be divided into different physical device pools, which may be located in different locations, as illustrated in FIG. 7. A cluster that is located in the same physical data center as the switch (for example, in Silicon Valley, Calif., USA) may have a very different latency or response time from a workload cluster located in Bangladesh, India. Furthermore, because of differences in configuration or processing capabilities, appliances located in an Oklahoma City cluster may have different response times from a cluster located in Boston.

Thus, in certain embodiments, it may be desirable to configure probes that are customized for a particular node, or for a group of nodes, such as a group of nodes co-located in a workload cluster. Thus, the probe can be customized to match the health monitoring methods supported by the node, and factors such as latency and response time can be accounted for.

A switch or router with native load balancing capabilities, combined with RAS (Reliability, Availability, Serviceability) features may help customers to build scalable and robust networks to meet high availability (HA) requirements and provide uninterrupted service to meet service level agreements (SLAB).

For example, consider a device pool provided by one or more workload clusters, with a plurality of nodes:
a. Node 1 is compatible with ICMP probes, and has very low latency. ICMP probe are sent periodically to monitor the health of node 1 and to determine its operational status. Because node 1 has very low latency, the wait-for-response time for this node is very low.
b. Node 3 is compatible with TCP probes, and is located in a remote data center. TCP probes are sent periodically to monitor the health of node 3 and to determine its operational status. Because node 3 is in a remote data center, it has a higher latency, and thus, a longer wait-for-response time is set for this node.

The cluster may also include a node 2 and a node 4. Node 2 is in the same workload cluster as node 1, and node 4 is in the same workload cluster as node 3. Thus, the probes for node 1 and node 2 may be of the same kind. They will differ in identification details, such as source or destination addresses, but they may otherwise be identical. Similarly, probes for node 3 and node 4 are of the same kind. But the probes for nodes 1 and 2 are "different in kind" than the probes for nodes 3 and 4. This means that they are different in more than mere identification details. For example, they may have different probing frequencies, wait-for-response times, or protocols. These probes may also have different values for N (the number of unresponsive probes before a node is marked as "down"), and for M (the number of responsive probes from a formerly down node before it is marked back "up").

In the example above, nodes 1 and 2 may belong to the same "probe group," while nodes 3 and 4 are of a different probe group. Nodes in the same probe group may have probes of the same kind, which may be different in kind from the nodes of a different probe group. However, in some cases, two different probe groups may have probes of the same kind. This may be for convenience, so that those probe groups can be easily reconfigured if needs change. For example, a workload cluster in a Salt Lake City data center may be one probe group, while a workload cluster in an Oklahoma City data center may be a different probe group. The features of these groups may be similar enough that initially the probes configured for them are the same. But if the Salt Lake City data center later starts experiencing higher latency, the probes in that group can easily be reconfigured with a new wait-for-response time.

In one example, a Cisco® N7000 switch may be provisioned with native load balancing capabilities (i.e., Cisco® ITD). An example command-line configuration for configuring different probes may be as follows:

N7k(config)# feature itd
N7k(config)# itd device-group WEBSERVERS
N7k(config-device-group)# node ip 20.20.20.2
N7k(config-dg-node)# probe icmp
N7k(config-device-group)# node ip 20.20.20.3
N7k(config-device-group)# node ip 20.20.20.4
N7k(config-dg-node)# probe tcp port 80
N7k(config-device-group)# node ip 20.20.20.5

There are also cases where it is advantageous to provide probes that are service specific within the same node or group of nodes in a probe group. For example, a computing device with a single physical IP address (say 20.20.20.3) may host both a simple mail transport protocol (SMTP) e-mail server on port 25, and an HTTP server on port 80. These may run under separate virtual machines on a hypervisor, or on the same operating system, in many different configurations. In that case, separate probes may be provided for the SMTP server and the HTTP server. As described above, these probes may be different in kind, even though the services may be hosted on the same physical server with the same IP address. The probes may vary in any of the ways discussed herein, such as using a different protocol, port number, probing frequency, or wait-for-response time, by way of non-limiting example. Note that the wait-for-response time may vary even though both services are hosted on the same hardware, as the different servers may have different response times. Thus, an SMTP probe may be sent to 20.20.20.3:25, while an HTTP probe may be sent to 20.20.20.3:80. SMTP and HTTP are, of course, only two illustrative examples disclosed for the purpose of discussion. Any two different services could be configured for use behind the same IP address, including two instances of the same service (e.g., two HTTP servers) that may benefit from different probes.

A system and method for providing service-specific probes in a native load balancer will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment. In some embodiments, hyphenated reference numerals, such as 10-1 and 10-2, may be used to refer to multiple instances of the same or a similar item 10, or to different species of a genus 10.

FIG. 1A is a network-level diagram of a secured enterprise 100 according to one or more examples of the present Specification. In the example of FIG. 1, a plurality of users 120 operates a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be any suitable computing devices. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of non-limiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

A network administrator 150 may operate an administration console 140 to administer a workload cluster 142 and to otherwise configure and enforce enterprise computing and security policies.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, a wireless base station 130, and an external server 180 may be provided on external network 172, by way of non-limiting example. Wireless base station 130 may be, for example, an LTE base station or other similar device that connects to mobile device 110-3 wirelessly. Wireless base station 130 may in turn communicatively couple to external network 172. External server 180 may be a server that provides web pages, data, or other resources that enterprise users 120 may need to use.

Figure 1B:
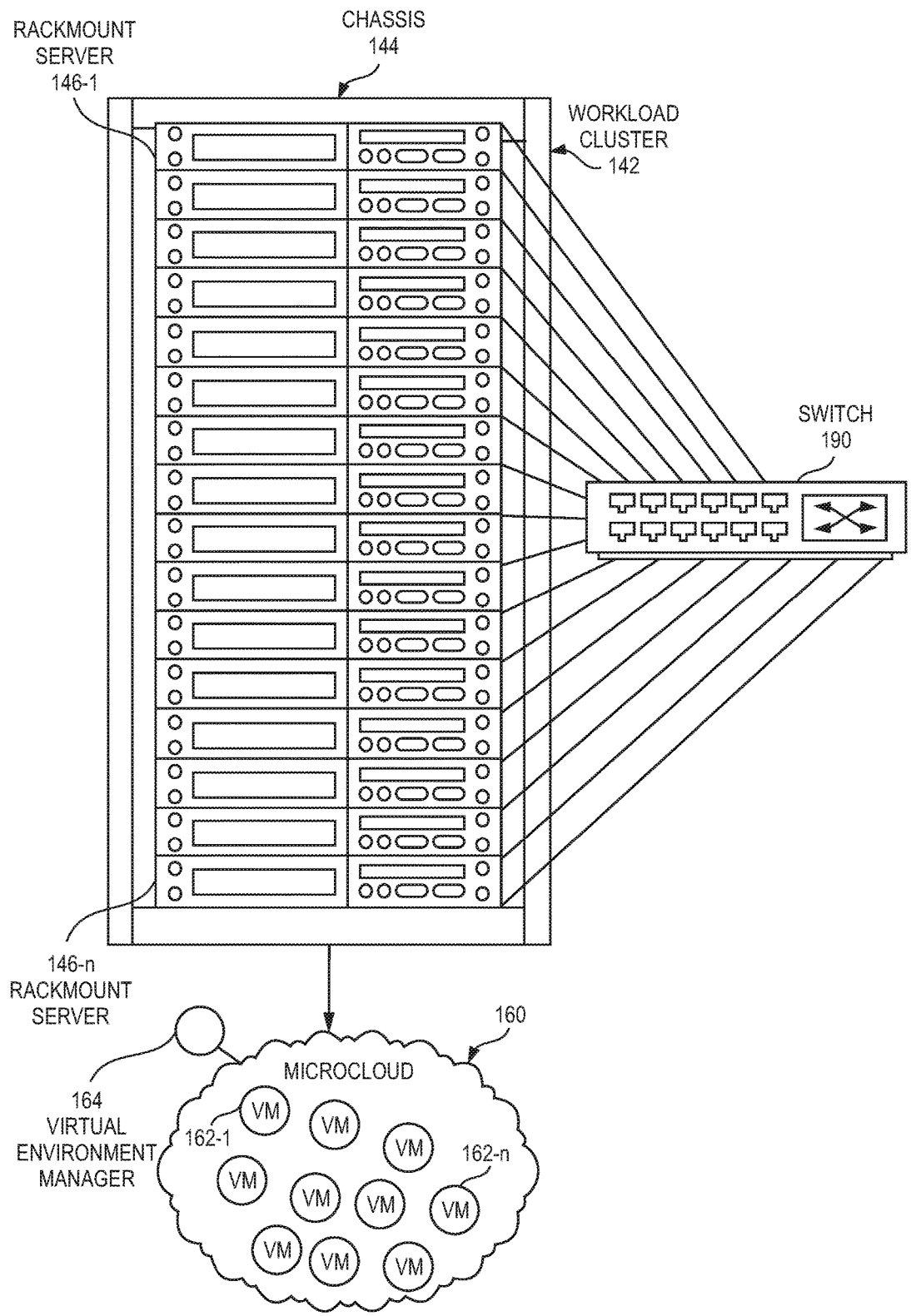
FIG. 1B is a more detailed view of a computing cluster according to one or more examples of the present Specification.

FIG. 1B is a block diagram disclosing a workload cluster 142 according to one or more examples of the present Specification. In this example, workload cluster 142 includes a rack mount chassis 144 which has installed therein a plurality of rack mount servers 146-1 through 146-N. Each rack mount server 146 may be a dedicated appliance, or may be configured with a hypervisor to launch one or more instances of a virtual client.

A switch 190 may be provided to communicatively couple workload cluster 142 to enterprise network 170. As described below, switch 190 may have a number of physical ports for communicatively coupling to rack mount servers 146. In an example, each server 146 has a physical wired connection, such as an Ethernet connection, to a single port of switch 190.

In some cases, some or all of rack mount servers 146-1 through 146-N are dedicated to providing a microcloud 160. Microcloud 160 may be a single purpose or dedicated cloud providing a particular service. For example, microcloud 160 may be configured to serve a website, provide communication systems such as one or more 4G LTE services, or any other appropriate service. In some cases, microcloud 160 is provided as a "tenant" on workload cluster 142. Workload cluster 142 may provide a virtual environment manager 164, which may be responsible for enforcing tenant boundaries between one or more microcloud tenants 160, and for dynamically provisioning virtual machines 162 as necessary. Virtual machines 162-1 through 162-N may represent a plurality of instances of a virtual server appliance. In some cases, VMs 162 may also be provided in different flavors. For example, some VMs 162 may be provisioned as firewalls, others may be provisioned as an antivirus scanning appliance, and yet others may provide other auxiliary functions, in addition to VMs 162 provisioned as workload servers.

When switch 190 is provisioned with a load-balancing engine, the load-balancing engine is responsible for keeping track of the number and virtual IP (VIP) of workload servers, so that it can properly route traffic to the workload servers. In the case where each rack mount server 146 is a standalone appliance, switch 190 may maintain a table of the VIP of each rack mount server 146. In cases where workload servers are provided in a microcloud 160, switch 190 may provide a table that maps the VIP of each VM to a VIP assigned to the physical rack mount server 146 on which that VM 162 resides. Thus, switch 190 may include logic not only for routing the packet to the correct rack mount server 146, but also for directing the packet to the correct VM 162 on that rack mount server 146.

Figure 2:
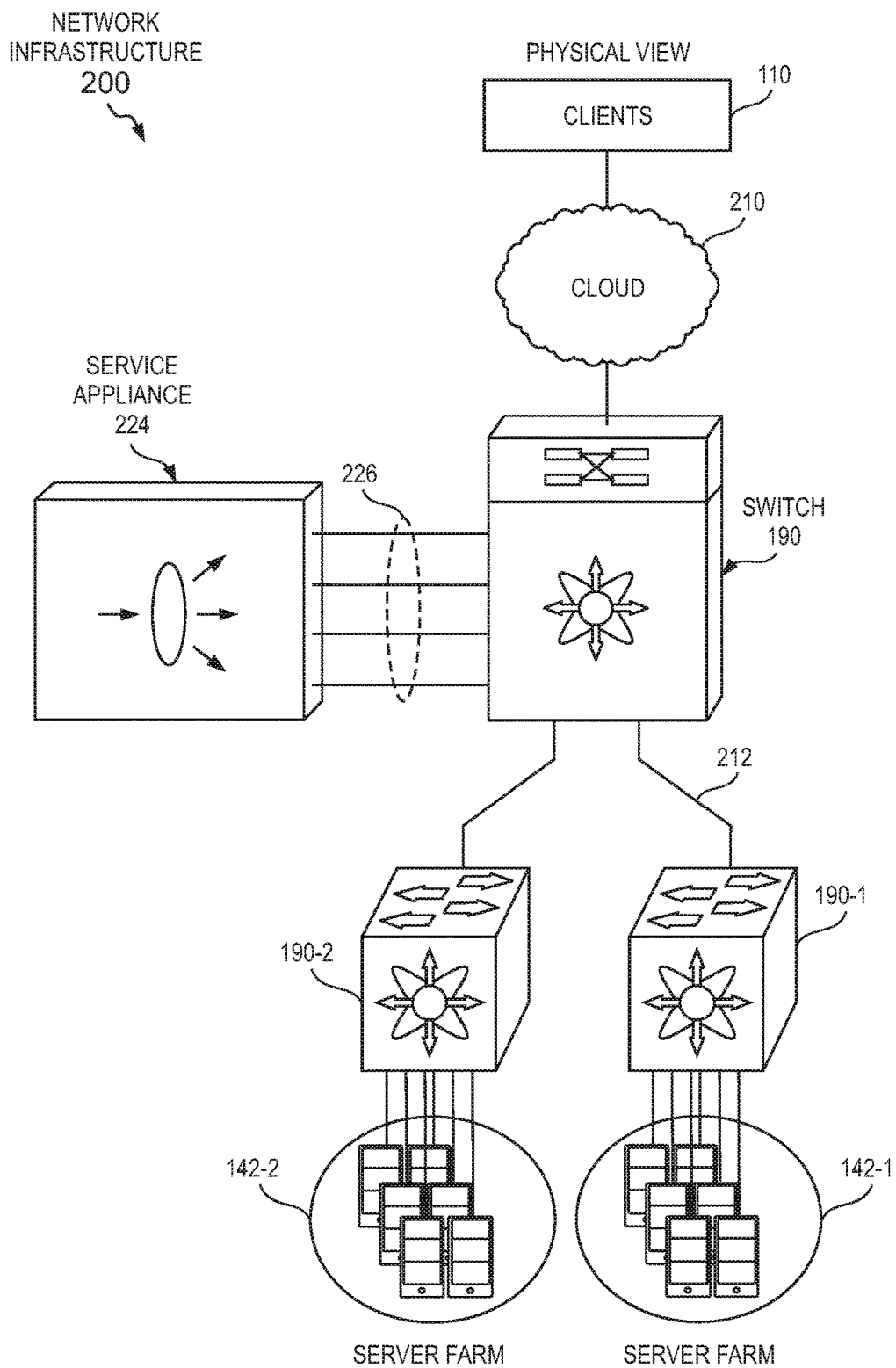
FIG. 2 is a is a simplified schematic diagram illustrating a physical view of a system for providing service appliances in a network environment according to one or more examples of the present Specification.

FIG. 2 is a simplified schematic diagram illustrating a physical view of a network infrastructure 200 for providing service appliances in a network environment. FIG. 2A includes a network (illustrated as multiple links 212) that connects one or more server farms 142-1 and 142-2 to one or more clients 110 via a cloud 210. Cloud 210 may encompass, for example, enterprise network 170 and external network 172 of FIG. 1. Individual servers in server farm 142-1 and 142-2 may communicate within the same farm via switches 190-1 and 190-2, respectively. Servers in server farm 142-1 may communicate with servers in server farm 142-2 via a switch 190 in this particular example implementation.

A service appliance 224 may connect to switch 190 over a communication channel 226 (for example, over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 190) to one or more receivers (e.g., service appliance 224). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of network infrastructure 200, communication channel 226 may be a single channel: deployed for both control messages (i.e., messages that include control packets) and data messages (i.e., messages that include data packets).

As used herein, a "service appliance" is a discrete (and generally separate) hardware device or virtual machine with integrated software (e.g., firmware), designed to provide one or more network services including load balancing, firewall, intrusion prevention, virtual private network (VPN), proxy, etc.

For purposes of illustrating the techniques of network infrastructure 200, it is important to understand the communications in a given system such as the system shown in FIGS. 1A and 2. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Some service appliances (e.g., load balancers) integrate services such as load balancing, firewall, intrusion prevention, VPN, etc. in a single box format, which is generally based on modular, scalable platforms and which provides a cost-effective option of the three options listed previously. Service appliances may be connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards may be installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Switches in network infrastructure 200, including switches 190 (FIG. 1A), and 190-1, and 190-2 (FIG. 2), may include any type of network element connecting network segments. For example, switch 190 may include a multi-port network bridge that processes and routes data at a data link layer (Layer 2). In another example, switch 190 may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switch 190 may be integrated into other network devices such as gateways, routers, or servers. In various embodiments, switch 190 may be a managed switch (e.g., managed using a command line interface (CLI), a web interface, etc.).

Communication channel 226 may include a port-channel, which can encompass an aggregation of multiple physical interfaces into one logical interface, for example, to provide higher aggregated bandwidth, load balancing and link redundancy. Communication channel 226 with multiple links can provide a high availability channel: if one link fails, traffic previously carried on this link can be switched to the remaining links. Communication channel 226 may contain up to 16 physical communication links and may span multiple modules for added high availability. In one embodiment, communication channel 226 can represent a port-channel with an aggregation of four point-to-point communication links over multiple ports. In another embodiment, communication channel 226 can represent a virtual port-channel (vPC).

Although FIG. 2 shows server farms 142-1 and 142-2, it should be appreciated that network infrastructure 200 is not limited to servers. In fact, any network element may be connected to the network via appropriate switches, where these implementations may be based on particular needs. As used herein, the term "network element" is meant to encompass computers, virtual machines, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 142-1 and 142-2 may be replaced with LANs connecting desktop computers in a small office. In another example, server farms 142-1 and 142-2 may be replaced with a network of wireless communication devices. In yet another example, server farms 142-1 and 142-2 may be replaced with one or more supercomputers. Various other configurations and devices are contemplated within the broad framework of the present disclosure.

According to embodiments of the present disclosure, network infrastructure 200 may provide for a fabric extender (FEX)-like protocol, auto-discovery, message transport service (MTS)-like control messages, and defined messages between service appliance 224 and switch 190. Configuration of service appliance 224 may be performed on switch 190 as for a line card. Data path forwarding may be offloaded to network line cards in switch 190. Control path processing may be offloaded to a supervisor engine on switch 190 as appropriate. In embodiments where service appliance 224 has multiple virtual services (e.g., virtual machines), each virtual service may be a separate virtual line card on switch 190.

Figure 3:
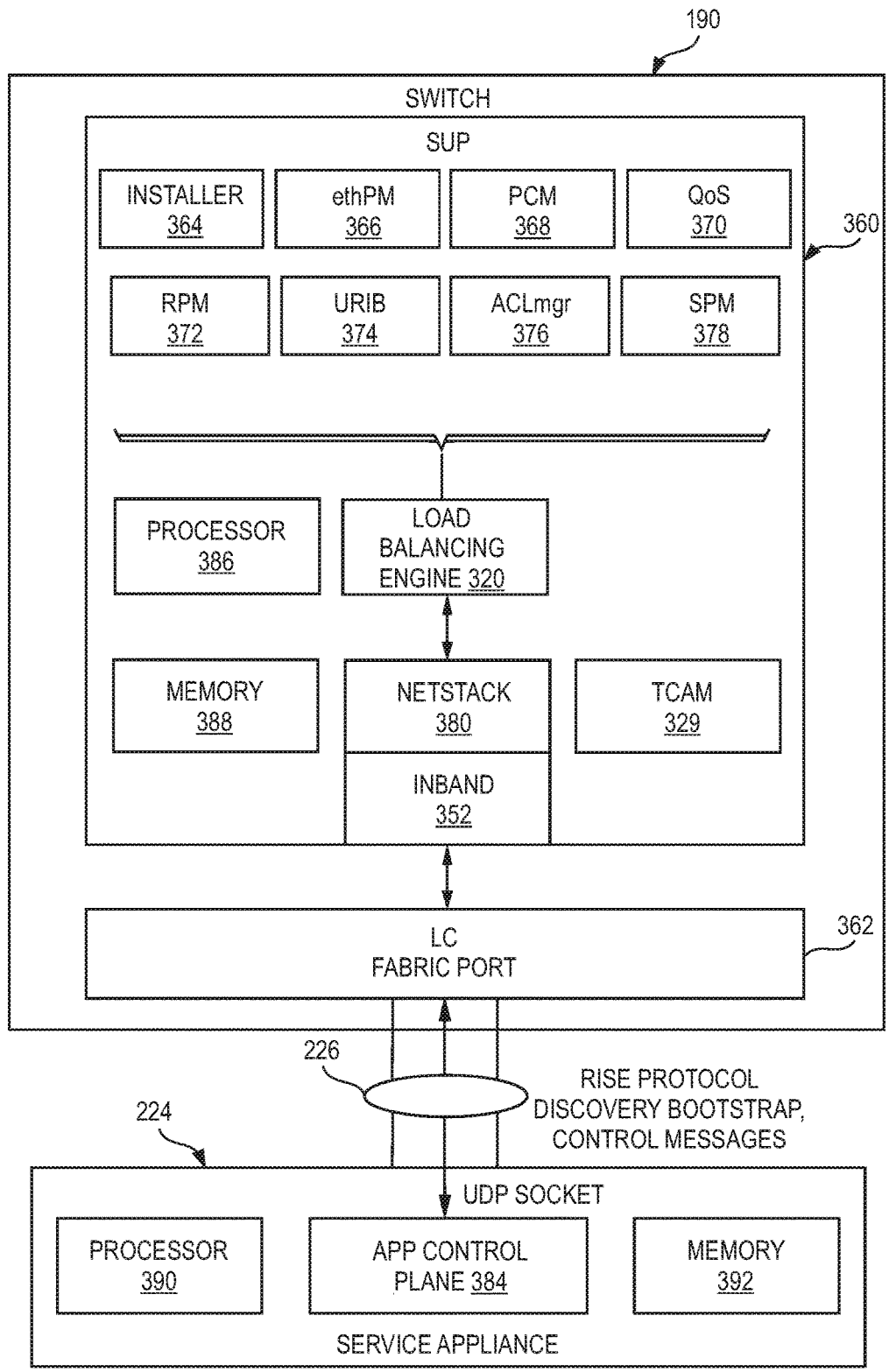
FIG. 3 is a block diagram of a network switch according to one or more examples of the present Specification.

FIG. 3 is a simplified block diagram illustrating example details of network infrastructure 200 according to embodiments of the present disclosure. Switch 190 may include a processor 386 and a memory 388. A supervisor engine 360 on switch 190 may communicate with service appliance 224 via a line card including a fabric port 362 that connects point-to-point to a node on service appliance 224. Supervisor engine 360 may include several modules such as an installer 364, an Ethernet port manager (ethPM) 366, a port-channel manager (PCM) 368, a Quality of Service (QoS) element 370, a route policy manager (RPM) 372, a unified/unicast routing information base (URIB) 374, an access control list manager (ACLmgr) 376, and a service policy manager (SPM) 378 for performing various routing and/or management functions.

Service appliance 224 may include, by way of non-limiting example, a processor 390, an application control plane 384, and a memory 392. Application control plane may communicate with switch 190 via communication channel 226, which may include for example a UDP socket.

In various embodiments, service appliance 224 may support stream control transmission protocol (SCTP) with various addresses (e.g., 127 addresses). In the absence of native SCTP support in supervisor engine 360, tunneling over UDP may be enforced to send SCTP packets. A Netstack module 380 may be provisioned in supervisor engine 360 for implementing TCP/IP stack for received frames hitting the control-plane of supervisor engine 360. Supervisor engine 360 may be configured with an inband port 352, which may be a virtual port that provides an interface for management traffic (such as auto-discovery) to a management processor such as a processor 386.

Each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 386 may be treated as only one core of a multi-core processor, or may be treated as the entire multi-core processor, as appropriate. In some embodiments, one or more co-processors may also be provided for specialized or support functions. In some examples, the processor is a programmable hardware device, which in this Specification expressly excludes a general-purpose CPU.

Load balancing engine 320, in one example, is operable to carry out computer-implemented methods as described in this Specification. Load balancing engine 320 may include one or more processors, and one or more non-transitory computer-readable mediums having stored thereon executable instructions operable to instruct a processor to provide load balancing. As used throughout this Specification, an "engine" includes any combination of one or more logic elements, of similar or dissimilar species, operable for and configured to perform one or more methods provided by load balancing engine 320. Thus, load balancing engine 320 may comprise one or more logic elements configured to provide methods as disclosed in this Specification. In some cases, load balancing engine 320 may include a special integrated circuit designed to carry out a method or a part thereof, and may also include software instructions operable to instruct a processor to perform the method. In some cases, load balancing engine 320 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that load balancing engine 320 may also include other hardware and software, including configuration files, registry entries, and interactive or user-mode software by way of non-limiting example.

In one example, load balancing engine 320 includes executable instructions stored on a non-transitory medium operable to perform a method according to this Specification. At an appropriate time, such as upon booting switch 190, or upon a command from the operating system or a user, the processor may retrieve a copy of load balancing engine 320 (or software portions thereof) from storage and load it into memory. The processor may then iteratively execute the instructions of load balancing engine 320 to provide the desired method.

In another example, load balancing engine 320 includes logic executed on an ASIC, FPGA, or other low-level hardware device specifically programmed to carry out the functions of load balancing engine 320. In one case, any portions of load balancing engine 320 that are not hardcoded into the logic may be loaded from a firmware or similar memory. In this case, load-balancing engine 320 may operate without the benefit of an operating system, to improve speed and efficiency.

Load balancing engine 320 may also communicatively couple to a TCAM 329. TCAM 329 may be configured to provide high-speed searching as disclosed herein.

Figures 4, 5:
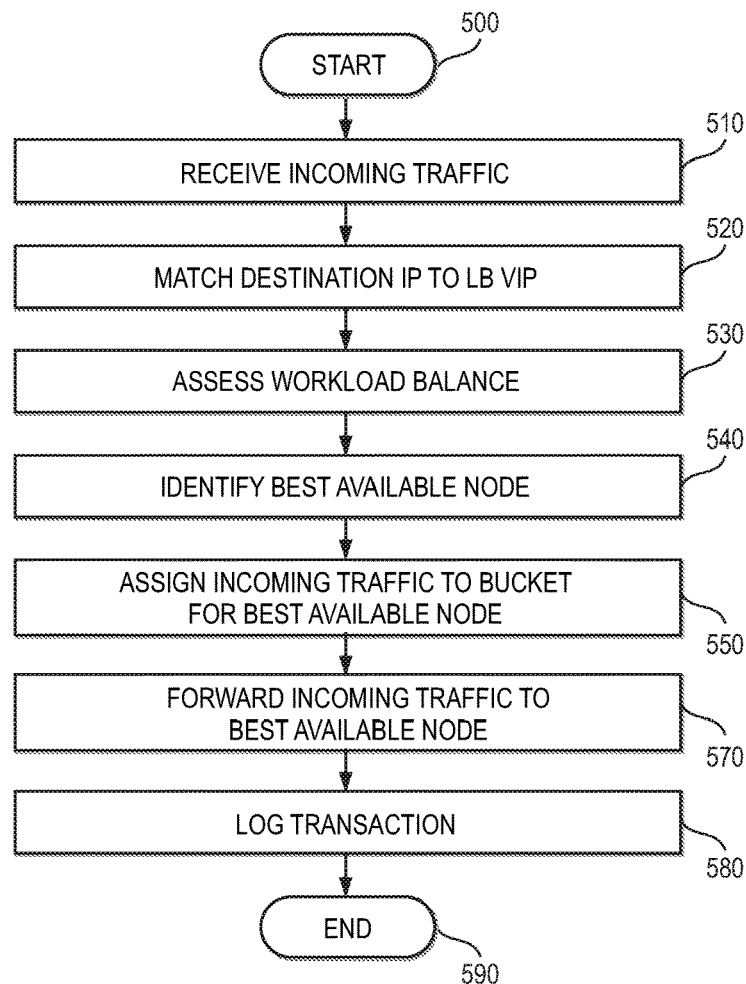
FIG. 4 is a block diagram of a routing table according to one or more examples of the present Specification.
FIG. 5 is a flow chart of a method performed by a switch according to one or more examples of the present Specification.

FIG. 4 is a block diagram of a routing table 400 according to one or more examples of the present Specification. In this example, four nodes are provided, designated node N0, N1, N2, and N3. Each node represents a server appliance having a unique VIP, whether a dedicated hardware server appliance or a virtual server appliance.

Load-balancing engine 320 designates 8 traffic buckets, labeled B0, B1, B2, B3, B4, B5, B6, and B7. Based on load and demand, load-balancing engine 320 maps each traffic bucket to an appropriate node. In this example, buckets B0 and B4 are mapped to node N0. Buckets B1 and B5 are mapped to node N1. Buckets B2 and B6 are mapped to node N2. Buckets B3 and B7 are mapped to node N3. These mappings are provided by way of non-limiting example only, and are provided strictly to illustrate the principle of mapping buckets to nodes.

When switch 190 receives incoming traffic, load-balancing engine 320 operates to execute an appropriate algorithm for assigning the incoming traffic to a traffic bucket. This may include, for example, random or pseudorandom assignment, round robin scheduling, or any suitable scheduling algorithm. In one example, an algorithm may be based on the source IP address of the incoming packet, as described in more detail in connection with FIGS. 7 and 8.

After assigning the traffic to a bucket, switch 190 modifies the packet with the appropriate VIP for the node servicing that bucket, and forwards the packet.

When a response comes, switch 190 modifies the packet to reflect the publically visible IP address of switch 190, so that the load balancing is completely invisible to external hosts.

FIG. 5 is a flowchart of an example method 500 performed by load-balancing engine 320 according to one or more examples of the present Specification.

In block 510, switch 190 receives incoming traffic and provides the incoming traffic to load-balancing engine 320.

In block 520, switch 190 compares the destination IP of the incoming traffic to the VIP designated for load balancing. If there is a match, the incoming traffic is provided to load balancing engine 320 for load balancing. If not, then switch 190 simply routes or switches the traffic according to its normal function.

In block 530, load-balancing engine 320 assesses workload balance for available workload servers. As described above, this may be performed via round-robin assignment, random or pseudo-random assignment, or any other suitable load balancing algorithm.

In block 540, load-balancing engine 320 identifies the best available node for servicing the incoming traffic, based on the assessing of block 530.

In block 550, according to the identifying of block 540, load-balancing engine 320 assigns the incoming traffic to a bucket for the best available node. Assigning to a node may comprise modifying the header to reflect the VIP for the assigned node.

In block 570, after load-balancing engine 320 has assigned the traffic to an appropriate bucket and thereby to an appropriate node, switch 190 forwards the incoming traffic to the node designated for servicing that bucket, specifically by forwarding the traffic to the appropriate VIP.

In block 580, load-balancing engine 320 may log the transaction, as appropriate or necessary.

In block 590, the method is done.

Figure 6:
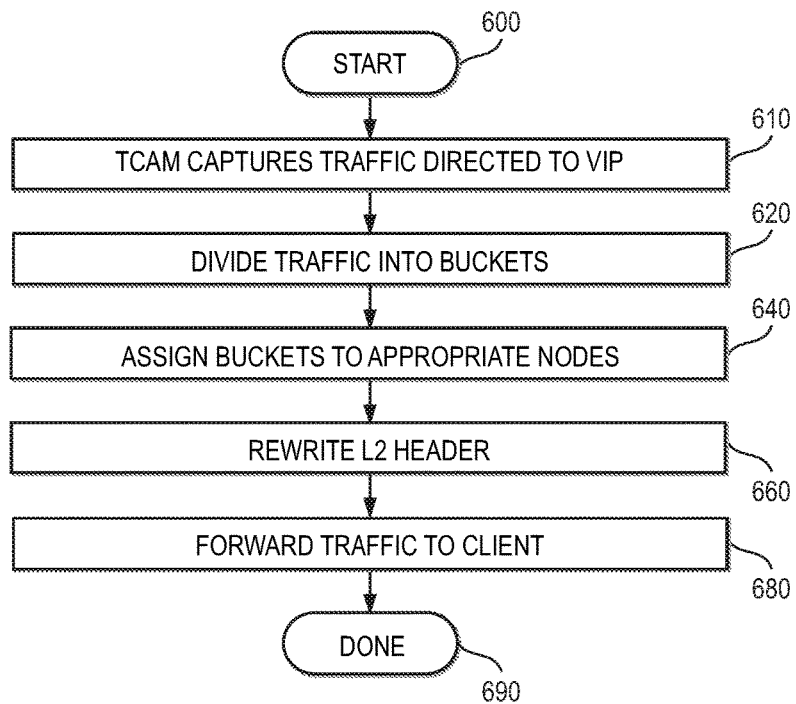
FIG. 6 is a flow chart of a method of load balancing according to one or more examples of the present Specification.

FIG. 6 illustrates a method of performing load balancing on a switch with the aid of a TCAM, such as TCAM 329 according to one or more examples of the present Specification. This example employs the notion of a flow. In an example, a flow is uniquely identified by a tuple T, comprising src-ip (source IP address), dst-ip (destination IP address), protocol, L4-src-port (layer 4 source port) and L4-dst-port (layer 4 destination port).

In an example, a client device 110-1 sends a packet directed to a VIP serviced by switch 190. By way of illustration, this flow is referred to as F1, and tuple T1 identifies flow F1. Tuple T1 comprises (Dev-110-1-IP, VIP, TCP, L4-src-port, L4-dest-port).

Similarly client device 110-2 initiates traffic to the same VIP. Since client 110-2's IP address is different from client 110-1's, this flow will have a different Tuple. By way of illustration, this is referred to as flow F2, identified by tuple T2. Tuple T2 comprises (Dev-110-2-IP, VIP, TCP, L4-src-port, L4-dest-port).

In various examples, sets of buckets may be part of a "pool," and one or more pools can be assigned to a single VIP, allowing VIP traffic to be load balanced among server nodes.

Referring now to method 600 in FIG. 6, it is assumed that switch 190 has now received flows F1 and F2.

In block 610, TCAM 329 looks up the IP address of VIP as it appears in both flows. In this example, both flows are directed to VIP, which is a virtual IP address for a service provided by servers in workload cluster 142. Thus, switch 190 can quickly determine that flows F1 and F2 are to be load balanced.

In block 620, load balancing engine 320 assigns each node to a traffic bucket as described herein. In certain examples, this may be accomplished by any of the load balancing algorithms disclosed herein, or by any other appropriate load balancing algorithm. In one example, assigning each flow to a bucket comprises assigning according to method 900 of FIG. 9, based on Dev-110-1-IP and Dev-110-2-IP respectively. In that case, TCAM 329 may include a table mapping masked IP address fragments to traffic buckets.

In block 640, load balancing engine 320 assigns each flow to a node for servicing, such as a workload server in workload cluster 142. This may be a deterministic assignment based on the traffic bucket that each flow was assigned to. For increased speed, this may also be performed using TCAM 329. For example, TCAM 329 may include a table mapping traffic buckets to service nodes.

In block 660, load balancing engine 320 rewrites the L2 header for the incoming packets. For example, assuming that flow F1 was assigned to service node 1 in workload cluster 142, and flow F2 was assigned to service node 2 in workload cluster 142, load balancing engine 320 rewrites the L2 headers for the packets in those flows to direct them to their respective service nodes.

In block 680, switch 190 is finished with its load balancing tasks, and now acts as a switch, switching or routing the packets to the nodes provided by their new L2 headers.

In block 690, the method is done.

Blocks 610 through 680 are repeated for each incoming packet, with an appropriate bucket and service node being selected for each. Assuming a well-configured load balancing engine 320, packets will be well distributed across available service nodes in workload cluster 142 so that workload is optimally distributed across available service nodes.

Reverse traffic (response from service nodes to client devices) are delivered directly to the respective clients without any intervention from load balancing engine 320.

FIG. 7 is a network diagram of a distributed data center according to one or more examples of the present Specification. In the example of FIG. 7, switch 190 is configured with Cisco® ITD capabilities, or some other native load balancing capability.

In this example, a first data center 142-1 is co-located with switch 190 within Silicon Valley data center 702-1. However, workload cluster 142-1 does not provide all of the computing capability allocated for the resource pool that switch 190 services. Rather, other workload clusters 142 located in other data centers 702 also contribute nodes to the pool.

These may include, for example, workload cluster 142-2, located in Salt Lake City data center 702-2, workload cluster 142-3, located in Oklahoma City data center 702-3, workload cluster 142-4 located in Boston data center 702-4, workload cluster 142-5 located in Dublin data center 702-5, and workload cluster 142-6 located in Bangladesh data center 702-6.

Not only are these data centers located all across the world, but the individual nodes or service appliances within these data centers may have different capabilities. For example, some data centers may provide physical server appliances, while other data centers may provide large racks of virtualized servers. Each of these servers may support or prefer different protocols, and may have different physical processing capabilities. The servers may have different SLAs, which means that some may be deemed more reliable than others. Those that are more reliable may not need to be probed as frequently. The different data centers are also located at very different distances, with presumably different numbers of intermediate routing hops in between. Thus, the routers will have very different latencies.

All of these factors may be considered when allocating probe groups. In some embodiments, a single probe group may be allocated for each separate data center 702. As necessary, data centers may also be broken down into greater granularity. For example, Boston data center 702-4 may provide both server appliances and virtualized servers that have different probing needs. In other cases, servers in different data centers may be more similar to one another than servers in the same data center, so that a single probe group could span two data centers. For example, Oklahoma City data center 702-3 and Salt Lake City data center 702-2 may have latency characteristics that are similar enough that a single wait-for-response value is appropriate for both. But both data centers may also provide a mixture of server appliances and virtualized servers, so that a probe group could be defined for the appliances in both data centers, and another group defined for the virtualized servers in both. Finally, as necessary, individual probe configurations can be defined for individual servers as necessary. The various styles of probe groups disclosed herein are provided by way of non-limiting example only, and should not be understood to be an exhaustive list.

Figure 8:
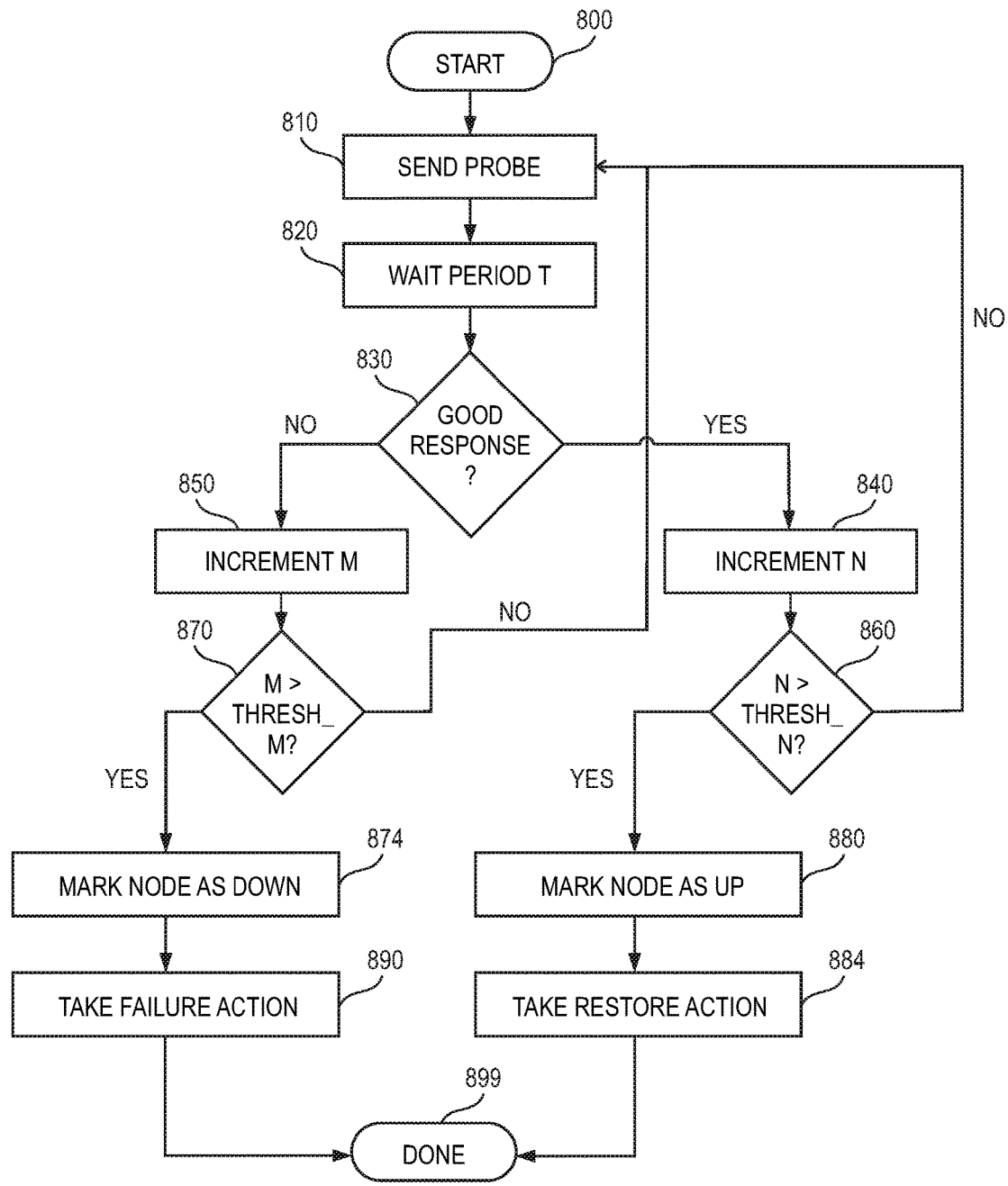
FIG. 8 is a flow chart of a method according to one or more examples of the present Specification.
Figure 9:
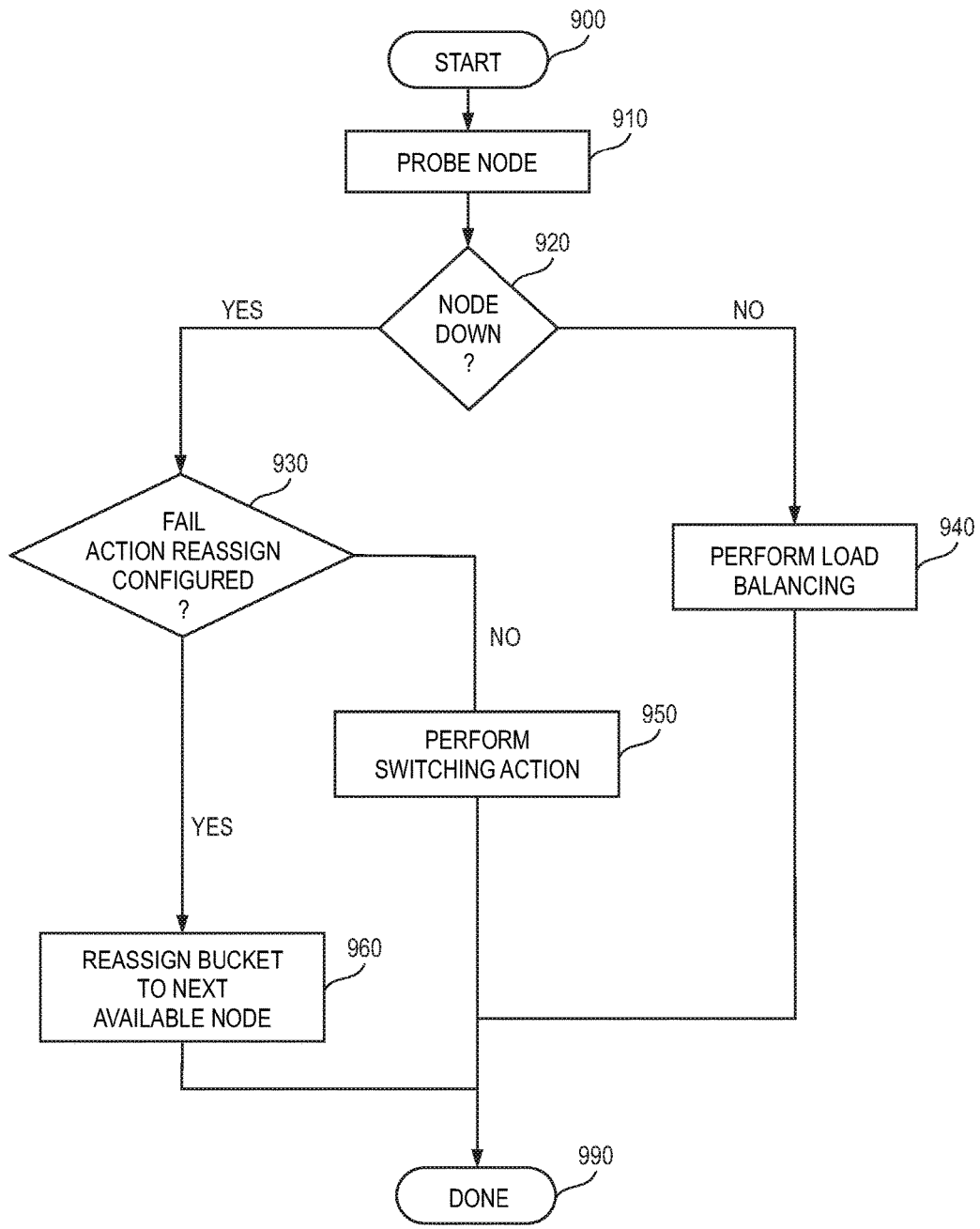
FIG. 9 is a flow chart of a method according to one or more examples of the present Specification.

FIGS. 8 and 9 are flow charts of methods of probing according to one or more examples of the present Specification. Note that the examples disclosed here are only non-limiting examples. Also note that the methods disclose probing according to one probe kind. Thus, the methods of FIGS. 8 and 9 may be repeated for each probe group according to the parameters defined in that probe group.

FIG. 8 is a flow chart of a method 800 performed by an embodiment of the present Specification.

In block 810, load balancing engine 320 sends a probe to a first service node of a server farm 142. The probe may include, as discussed above, a network packet of any suitable form, such as ICMP, TCP, UDP, DNS, and HTTP, by way of non-limiting example.

In block 820, load-balancing engine 320 waits a maximum of period T, which may be user selectable and configurable, such as via a command line. This period is referred to herein as a timeout, and can be selected to provide the first service node sufficient time to reasonably respond, but not be so long as to inhibit the usability of the probing mechanism. An example value of T may be between 1 ms and 604,900,000 ms. In one example, the default value of T is set at 10 ms, but is adjustable to or may be selected to be any value within the range.

In decision block 830, load-balancing engine 320 determines whether a good response was received from the first service node within period T.

If not, in block 850, load balancing engine 830 increments a counter M. The purpose of counter M in one embodiment is to ensure that a node is not marked as down too quickly. This can be important in particular cases where a node or the network experiences "jitter." In that case, a node may flit between "up" and "down" states numerous times a second, thus creating instability in service operation.

In decision block 870, load balancing engine 320 checks whether M is above a threshold $Th_M$. The value of $Th_M$ may also be user selectable, and may be selected to provide a reasonable assurance that the first node is actually down, without taking so long as to inhibit the probing mechanism. In one example, $Th_M$ may be between 1 and 5 counts, with a default value of 5 counts, although defaults of 1, 2, 3, and 4 counts are also anticipated.

If the node is down, in block 874, load balancing engine 320 marks the node as "down." This may involve updating appropriate routing tables, or sending a notification signal. It may also involve resetting counter M.

In block 890, load balancing engine 320 causes switch 190 to take any failure action, such as providing a notification and reorganizing its load balancing tables.

In block 899, the method is done.

Returning to decision block 870, if M is not above $Th_M$, load balancing engine 320 returns to block 810 to send another probe.

Returning to decision block 830, if a good response is received, then in block 840 load balancing engine 320 increments a counter N. As with counter M, the purpose of counter N in one embodiment is to ensure that a node is not marked as "up" too quickly.

In decision block 860, load balancing engine 320 checks whether N is greater than a threshold $Th_N$. As with $Th_M$, the value of $Th_N$ may be user selectable, and may be selected to provide a reasonable assurance that the first node is actually up, without taking so long as to inhibit the probing mechanism. In one example, $Th_N$ may be between 1 and 5 counts, with a default value of 5 counts, although defaults of 1, 2, 3, and 4 counts are also anticipated.

If N is not above $Th_N$, load balancing engine 320 returns to block 810 to send another probe. The frequency of probes may have a period between 1 and 604,900 seconds, with a default of 60 seconds, though any value within the range may be selected as or may be the default.

Returning to decision block 860, if N is greater than $Th_N$, then in block 880, the first service node is marked as up.

In block 884, load balancing engine 320 takes any appropriate "restore" action, such as returning traffic buckets to the newly-restored node. Counter N may also be reset to zero.

In block 899, the method is done.

FIG. 9 is a block diagram of a method 900 of failaction handling according to one or more examples of the present Specification.

In block 910, load balancing engine 320 probes the first service node, such as according to method 800 of FIG. 8. Other suitable probes may also be used, such as hardware based probes, self-reporting, or any other suitable probing mechanism.

In decision block 920, load balancing engine 320 determines whether the node is down, based at least in part on the probe.

In block 940, if the node is not down, then load balancing engine 320 performs its ordinary load balancing function.

Returning to decision block 920, if the first node is down, then in decision block 930, load balancing engine 320 determines whether failaction reassignment is configured.

If it is, then in block 960, load balancing engine 320 reassigns traffic buckets for the first service node to a second service node, such as the next available service node in an ordinal list. The second service node may also be found on a lookup table, or via a mathematical formula or through any other suitable means.

Returning to decision block 930, if failaction reassignment is not configured, then in block 950, switch 190 performs its ordinary routing or switching action.

In block 990, the method is done.

Figure 10:
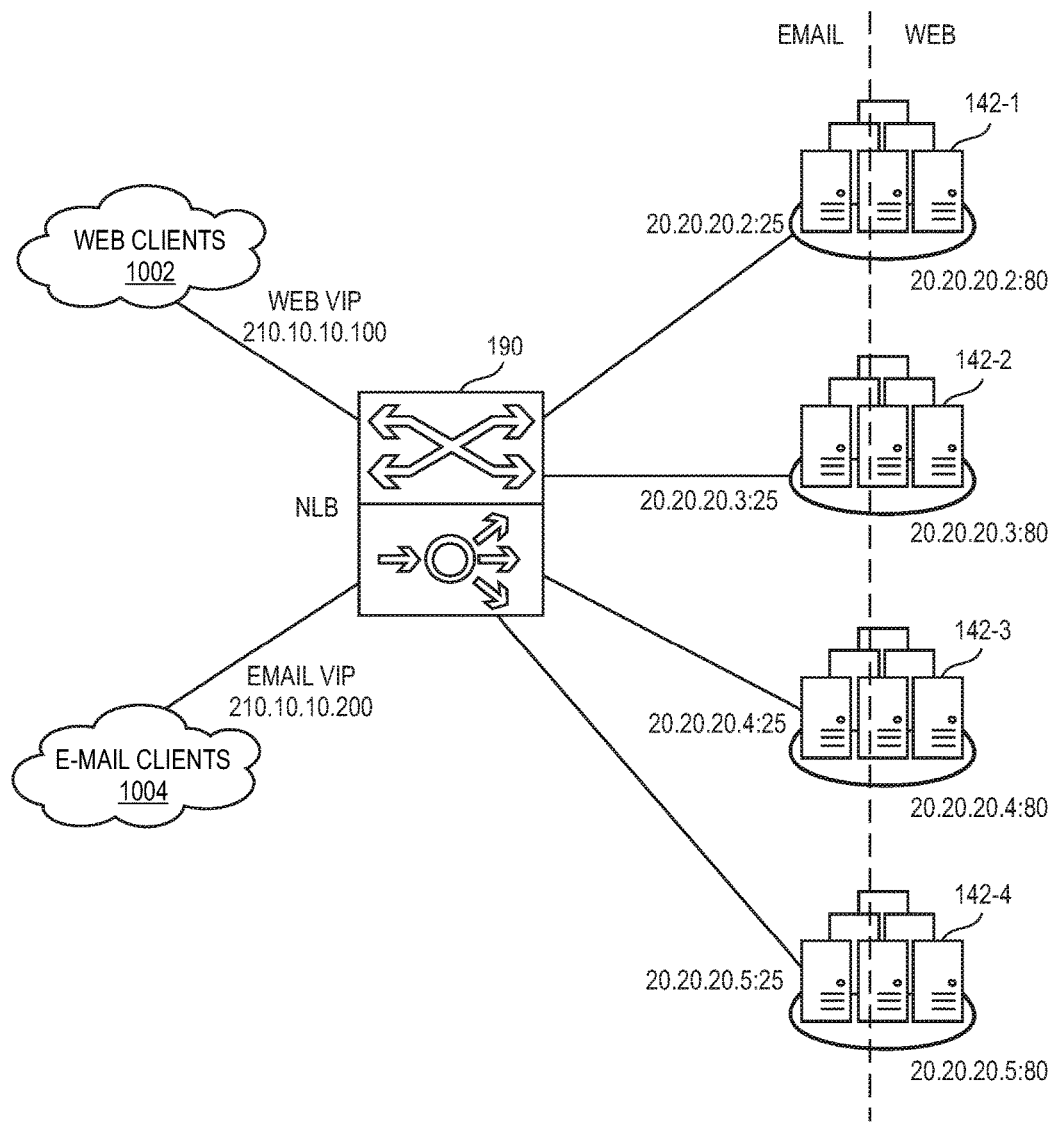
FIG. 10 is a network diagram that illustrates an embodiment where service-specific probes may be beneficial.

FIG. 10 is a network diagram that illustrates an embodiment where service-specific probes may be beneficial.

In this example, a large number of web clients 1002 (e.g., people or businesses needing access to a webpage) access web services via VIP 210.10.10.100:80. E-mail clients 1004 access SMTP e-mail services via VIP 210.10.10.200:25. Switch 190 receives incoming traffic and natively load balances the traffic to service nodes 142, which may be individual appliances, servers, or service node clusters as appropriate to the embodiment.

Switch 190 is configured with native load balancing, and has access to a plurality of servers or cluster 142, namely 142-1, 142-2, 142-3, and 142-4. In this example, each server or cluster 142 is configured to provide both e-mail service on port 25, and web service on port 80. In each case, the services sit behind the same IP address on the server. Specifically, cluster 142-1 provides SMTP e-mail service on 20.20.20.2:25 and HTTP web service on 20.20.20.2:80. Cluster 142-2 provides SMTP e-mail service on 20.20.20.3:25 and HTTP web service on 20.20.20.3:80. Cluster 142-3 provides SMTP e-mail service on 20.20.20.4:25 and HTTP web service on 20.20.20.4:80. Cluster 142-4 provides SMTP e-mail service on 20.20.20.5:25 and HTTP web service on 20.20.20.5:80.

As discussed above, it may be necessary to provide different probes to different clusters 142. For example, the clusters could be located in different locations. In this case, besides providing different cluster-specific probes, service-specific probes may also be provided. Thus, a first probe of the SMTP e-mail server on 20.20.20.2 may be different in kind from a second probe of the HTTP web server on the same node with the same IP address. As discussed above, the difference may be of any of the factors discussed above. Note that it may also be desirable to probe the hardware itself, in which case a third probe, different in kind from the first and second probes, may also be provided.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 224 and/or switch 190 (e.g., through various modules, algorithms, processes, etc.). In some embodiments, one or more of these features may be implemented in hardware, provided external to these elements, or consolidated in any appropriate manner to achieve the intended functionality. Service appliance 224 and/or switch 190 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 190 and service appliance 224 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 392, memory 388) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 386 and processor 390 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in network infrastructure 200 can include one or more memory elements (e.g., memory 388, memory 392) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in network infrastructure 200 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, network infrastructure 200 may be applicable to other exchanges, formats, or routing protocols. Moreover, although network infrastructure 200 has been illustrated with reference to particular elements and operations that facilitate the communication process, these elements, and operations may be replaced by any suitable architecture or process that achieves the intended functionality of network infrastructure 200.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

By way of non-limiting example, there is disclosed a network apparatus for providing native load balancing, comprising: a first network interface to communicatively couple to a first network; a plurality of second network interfaces to communicatively couple to a second network; one or more logic elements comprising a switching engine to provide network switching or routing; and one or more logic elements, including at least one hardware logic element, comprising a load balancing engine to: load balance network traffic among a plurality of service nodes; probe a service node with a first probe for a first service; and probe the service node with a second probe for a second service, the second probe different in kind from the first probe.

There is further disclosed an example, wherein the first probe is configured for a first protocol, and the second probe is configured for a second protocol different from the first protocol.

There is further disclosed an example, wherein the first probe is configured for a first port, and the second probe is configured for a second port different from the first port.

There is further disclosed an example, wherein the load balancing engine is further to probe the service node with a third probe, different in kind from the first probe and the second probe.

There is further disclosed an example, wherein the third probe is to probe availability of the service node.

There is further disclosed an example, wherein the first probe comprises a first protocol, and the second probe comprises a second protocol different from the first protocol.

There is further disclosed an example, wherein the service node is to host the first service and the second service on the same physical hardware.

There is further disclosed in an example, one or more tangible, non-transitory computer-readable mediums having stored thereon executable instructions for instructing a processor to: communicatively couple to a first network via a first network interface; communicatively couple to a second network via a plurality of second network interface; provide network switching or routing; and provide a load balancing engine to: load balance network traffic among a plurality of service nodes; probe a service node with a first probe for a first service; and probe the service node with a second probe for a second service, the second probe different in kind from the first probe.

There is further disclosed an example, wherein the first probe is configured for a first protocol, and the second probe is configured for a second protocol different from the first protocol.

There is further disclosed an example, wherein the first probe is configured for a first port, and the second probe is configured for a second port different from the first port.

There is further disclosed an example, wherein the load balancing engine is further to probe the service node with a third probe, different in kind from the first probe and the second probe.

There is further disclosed an example, wherein the third probe is to probe availability of the service node.

There is further disclosed an example, wherein the first probe comprises a first protocol, and the second probe comprises a second protocol different from the first protocol.

There is further disclosed an example, wherein the service node is to host the first service and the second service on the same physical hardware.

There is further disclosed in an example, a computer-implemented method, comprising: communicatively coupling to a first network via a first network interface; communicatively coupling to a second network via a plurality of second network interface; providing network switching or routing; load balancing network traffic among a plurality of service nodes; probing a service node with a first probe for a first service; and probing the service node with a second probe for a second service, the second probe different in kind from the first probe.

There is further disclosed an example, wherein the first probe is configured for a first protocol, and the second probe is configured for a second protocol different from the first protocol.

There is further disclosed an example, wherein the first probe is configured for a first port, and the second probe is configured for a second port different from the first port.

There is further disclosed an example, further comprising probing the service node with a third probe, different in kind from the first probe and the second probe.

There is further disclosed an example, wherein the third probe is to probe availability of the service node.

There is further disclosed an example, wherein the first probe comprises a first protocol, and the second probe comprises a second protocol different from the first protocol.

There is further disclosed in an example, means for providing any of the foregoing.

There is further disclosed an example, wherein the means comprise a processor and a memory.

There is further disclosed an example, wherein the means comprise a computing apparatus.

There is further disclosed an example, wherein the means comprise a switch or a router.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke subsection (f) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

What is claimed is:

1. A network apparatus for providing native load balancing, comprising:
   a first network interface to communicatively couple to a first network;
   a plurality of second network interfaces to communicatively couple to a second network; and
   a switching engine to provide network routing between the first network and the second network, the switching engine comprising a load balancing engine configured to:
   probe a service node with a first probe for a first service;
   probe the service node with a second probe for a second service, the second probe different in kind from the first probe;
   load balance a network traffic among a plurality of servers based on responses to the first probe and the second probe, the plurality of servers being located in the second network and configured to provide the first service and the second service wherein a plurality of traffic is classified into buckets, wherein each bucket is assigned to at least one server of the plurality of servers, wherein each of the plurality of servers is assigned a Virtual IP (VIP) tag, wherein the buckets and a corresponding VIP tag of corresponding at least one server assigned to each of the buckets are stored in a content addressable memory accessible to the network apparatus;
   determine a bucket corresponding to the network traffic;
   determine the corresponding VIP tag of the corresponding at least one server assigned to the bucket; and
   forward the network traffic to the at least one server.

2. The network apparatus of claim 1, wherein the first probe is configured for a first protocol, and the second probe is configured for a second protocol different from the first protocol.

3. The network apparatus of claim 1, wherein the first probe is configured for a first port, and the second probe is configured for a second port different from the first port.

4. The network apparatus of claim 1, wherein the load balancing engine is further to probe the service node with a third probe, different in kind from the first probe and the second probe.

5. The network apparatus of claim 4, wherein the third probe is to probe availability of the service node.

6. The network apparatus of claim 1, wherein the service node is to host the first service and the second service on a same physical hardware.

7. A non-transitory computer-readable medium having stored thereon executable instructions for instructing a processor to:
   communicatively couple to a first network via a first network interface;
   communicatively couple to a second network via a plurality of second network interface;
   probe a service node with a first probe for a first service;
   probe the service node with a second probe for a second service, the second probe different in kind from the first probe;
   load balance a network traffic among a plurality of servers based on responses to the first probe and the second probe, the plurality of servers being located in the second network and configured to provide the first service and the second service wherein a plurality of traffic is classified into buckets, wherein each bucket is assigned to at least one server of the plurality of servers, wherein each of the plurality of servers is assigned a Virtual IP (VIP) tag, wherein the buckets and a corresponding VIP tag of corresponding at least one server assigned to each of the buckets are stored in a content addressable memory accessible to the network apparatus;
   determine a bucket corresponding to the network traffic;
   determine the corresponding VIP tag of the corresponding at least one server assigned to the bucket; and
   forward the network traffic to the at least one server.

8. The non-transitory computer-readable medium of claim 7, wherein the first probe is configured for a first protocol, and the second probe is configured for a second protocol different from the first protocol.

9. The non-transitory computer-readable medium of claim 7, wherein the first probe is configured for a first port, and the second probe is configured for a second port different from the first port.

10. The non-transitory computer-readable medium of claim 7, wherein the load balancing engine is further to probe the service node with a third probe, different in kind from the first probe and the second probe.

11. The non-transitory computer-readable medium of claim 10, wherein the third probe is to probe availability of the service node.

12. The non-transitory computer-readable medium of claim 7, wherein the first probe comprises a first protocol, and the second probe comprises a second protocol different from the first protocol.

13. The non-transitory computer-readable medium of claim 7, wherein the service node is to host the first service and the second service on a same physical hardware.

14. A computer-implemented method, comprising:
    communicatively coupling to a first network via a first network interface;
    communicatively coupling to a second network via a plurality of second network interface;
    probing a service node with a first probe for a first service;
    probing the service node with a second probe for a second service, the second probe different in kind from the first probe;
    load balancing a network traffic among a plurality of servers based on responses to the first probe and the second probe, the plurality of servers being located in the second network and configured to provide the first service and the second service wherein a plurality of traffic is classified into buckets, wherein each bucket is assigned to at least one server of the plurality of servers, wherein each of the plurality of servers is assigned a Virtual IP (VIP) tag, wherein the buckets and a corresponding VIP tag of corresponding at least one server assigned to each of the buckets are stored in a content addressable memory accessible to the network apparatus;
    determining a bucket corresponding to the network traffic;
    determining the corresponding VIP tag of the corresponding at least one server assigned to the bucket; and
    forwarding the network traffic to the at least one server.

15. The method of claim 14, wherein the first probe is configured for a first protocol, and the second probe is configured for a second protocol different from the first protocol.

16. The method of claim 14, wherein the first probe is configured for a first port, and the second probe is configured for a second port different from the first port.

17. The method of claim 14, further comprising probing the service node with a third probe, different in kind from the first probe and the second probe.

18. The method of claim 17, wherein the third probe is to probe availability of the service node.

19. The method of claim 14, wherein the first probe comprises a first protocol, and the second probe comprises a second protocol different from the first protocol.

* * * * *